Patented May 21, 1935

2,001,767

UNITED STATES PATENT OFFICE 2,001,767

OCTYLSALICYLIC ACID

Herman A. Bruson, Germantown, and Otto Stein, Drexel Hill, Pa., assignors to Röhm & Haas Company, Philadelphia, Pa.

No Drawing. Application October 1, 1931, Serial No. 566,314

4 Claims. (Cl. 260—111)

This invention relates to octyl salicylic acid and a method for preparing same. Octyl salicylic acid possesses valuable fungicidal properties, especially against organisms of the ring-worm type.

According to this invention octanol-1 or octanol-2 is heated with salicylic acid in the presence of sulphuric acid and water, to yield directly an octylsalicylic acid. The latter compound is probably the para-secondary octyl isomer, having the probable formula

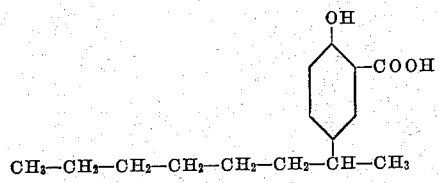

and forms, when pure, colorless waxy crystals melting at 120° C.

The preferred manner of effecting the condensation is as follows:

To 1400 grams of 80% sulphuric acid at 75° C. a mixture of 100 grams salicylic acid and 200 grams octanol-2 are added and the mixture stirred vigorously at 75° C. for 10 hours. The dark brown oily layer which is formed is separated from the lower aqueous acid layer after diluting with an equal volume of water. This oil contains the octylsalicylic acid besides a small amount of octylsalicylate together with other bodies which are not soluble in cold sodium bicarbonate solution. The oil is purified by diluting with twice its volume of an organic solvent which is immiscible with water, such as toluene, ether, etc., and extracting this solution with excess cold 10% sodium bicarbonate solution. Upon acidifying the alkaline extract, crude octylsalicylic acid separates as an oil. It is boiled with water to separate traces of free salicylic acid and, after freeing it from moisture, is distilled in vacuo. The octylsalicylic acid comes over as a pale yellow oil boiling at about 168–172° C. at 4 mm. and solidifies on cooling to a waxy, crystal mass which after repeated recrystallizations from light petroleum melts at 120° C. It is almost insoluble in water.

In the above example, the octanol-2 may be replaced by an equal amount of octanol-1, to produce the same octylsalicylic acid. The temperature during the condensation can be varied from about 65° to 100° C. The strength of the sulphuric acid used may vary from 70 to 85% $H_2SO_4$, the balance being water. The quantity of octyl alcohol used is preferably in excess of the theoretical amount required.

What we claim is:

1. In the process for making a secondary octylsalicylic acid the step which comprises condensing salicylic acid with a member of the group consisting of octanol-1 and octanol-2, in the presence of aqueous sulfuric acid of between 70 and 85 percent $H_2SO_4$ content.

2. In the process for making a secondary octyl salicylic acid, the step which comprises heating salicylic acid with octanol-2 at temperatures of substantially 65 to 100° C. in the presence of sulphuric acid of substantially 80% $H_2SO_4$ content.

3. A new product, secondary octylsalicylic acid, said product being a crystalline compound insoluble in water which melts when pure at about 120° C.

4. A process for making secondary octylsalicylic acid which comprises heating together at reaction temperature, reacting proportions of salicylic acid and octanol-2 in the presence of 70–85% sulfuric acid as a condensing agent, the sulfuric acid being used in an amount substantially greater than the weight of the salicylic acid.

HERMAN A. BRUSON.
OTTO STEIN.